United States Patent Office 3,826,684
Patented July 30, 1974

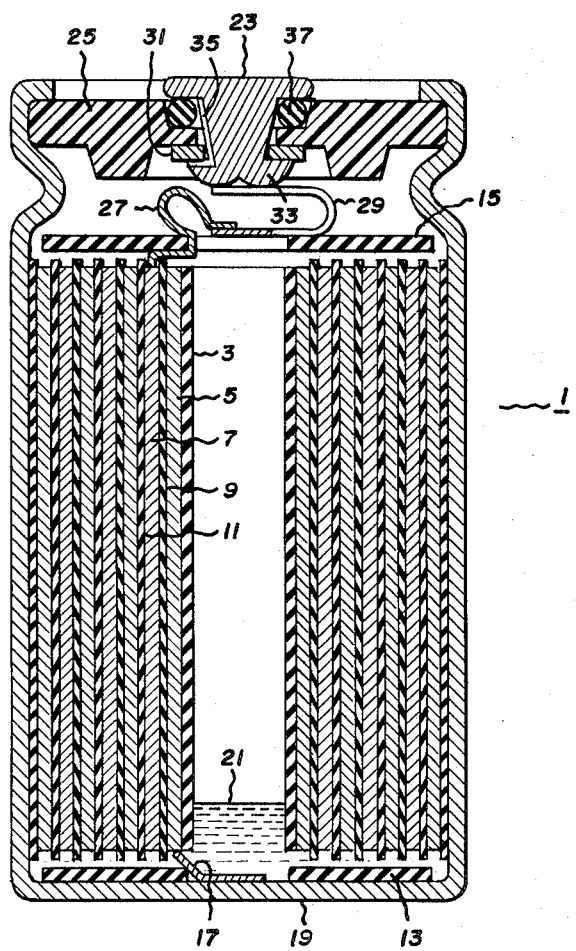

3,826,684
NICKEL ELECTRODE CELL WITH IMPROVED HIGH TEMPERATURE CHARGE ACCEPTANCE
Saverio F. Pensabene, Gainesville, Fla., assignor to General Electric Company
Continuation-in-part of abandoned application Ser. No. 762,092, Sept. 24, 1968. This application Jan. 4, 1971, Ser. No. 74,818
Int. Cl. H01m 43/04
U.S. Cl. 136—28　　　　　　　　　　　　　　　2 Claims

ABSTRACT OF THE DISCLOSURE

Hydroxides of zinc, mercury of Group IIA metals are added adjacent the surfaces of a rechargeable positive nickel electrode containing nickel hydroxide as the active rechargeable material in the discharged state. The hydroxide additive improves the charge acceptance and energy storage capacity of cells with nickel electrodes charged at a temperature above 77° F.

---

This application is a continuation-in-part of my previous application, Ser. No. 762,092, filed Sept. 24, 1968, now abandoned.

My invention is directed to a cell having a rechargeable positive nickel electrode capable of increased charge acceptance at temperatures above ambient.

It has been observed that as the temperature of a cell having a rechargeable positive nickel electrode is increased its capacity decreases. For example, in nickel-cadmium cells it has been observed that cells charged at 110° F. exhibit only 50 to 80 percent of the energy storage capacity of otherwise identical cells charged at 77° F. It is for this reason that the maximum recommended operating temperature for nickel-cadmium cells is set at 120° F. Investigation of nickel-cadmium cells has shown that the loss of energy storage capacity is primarily attributable to the nickel electrode, with the cadmium electrode retaining very nearly 100% of its ambient temperature capacity.

It is an object of my invention to provide a cell having a rechargeable positive nickel electrode capable of improved charge acceptance at temperatures above ambient.

It is another object of the invention to provide a method for making a rechargeable positive nickel electrode capable of improved charge acceptance at temperatures above ambient.

This and other objects of my invention may be accomplished by providing a cell having a rechargeable positive nickel electrode, a negative counter electrode, and an aqueous alkaline electrolyte providing ionic conductivity between the electrodes. The rechargeable positive nickel electrode is comprised of a current collector and a rechargeable active composition intimately associated with the surface of the current collector consisting essentially of, in the discharged state of the rechargeable active composition, nickel hydroxide, $Ni(OH)_2$, the hydroxide of at least one metal selected from the group consisting of zinc, mercury, and Group IIA metals in an amount sufficient to improve charge acceptance of the nickel hydroxide at temperatures above 77° F.

My invention may be better understood by reference to the following detailed description considered in conjunction with the drawing which is a vertical section of a cell according to my invention.

Cells constructed according to my invention include at least one rechargeable positive nickel electrode. Such nickel electrodes are made up of a chemically inactive, highly electronically conductive component, commonly termed a current collector, and a rechargeable active composition that is electrochemically reduced on cell discharge.

The current collector may take any conventional form. Typically, current collectors are in the form of foraminous metallic bodies, such as sintered plaques, woven or expanded metal screens, felted metal, foamed metal, etc. It is recognized that the current collector need not be foraminous, but may take the form of one or more imperforate metal plates. Also, the current collector need not be a coherent structural element. For example, the function of current collection may be performed by dispersing within the rechargeable active composition highly electronically conductive particles. For rechargeable positive nickel electrodes it is preferred to utilize metallic nickel as a current collector material, although, at increased expense, any of the light or heavy platinum triad metals as well as other relatively noble metals, such as gold, may be substituted.

The current collector is preferably related to the active rechargeable material so as to minimize the internal resistance of the resulting electrode. In most instances the current collector forms a foraminous skeleton which holds the rechargeable material in intimate contact. The rechargeable active composition may be chemically precipitated in the pores or may be electrodeposited or deposited by electrophoresis in the pores of the current collector. Where the pores are wide as compared to their depth, the rechargeable active material may be physically pasted or spread onto the current collector. In certain electorde constructions the rechargeable active composition may take the form of a separate layer having one or more current collector screens or plates pressed against a major surface. To assure desirably low levels of internal resistance it is preferred that the current collector constitute at least 20% by weight of the rechargeable nickel positive electrode.

A preferred current collector for the practice of my invention is formed by flattening an expanded metal screen and covering it with metal particles and water in one-to-one volume ratio, where the mixture is thickened with approximately one percent sodium carboxymethylcellulose or any equivalent thickening agent. The screen so covered is first dried and then sintered to join the metal particles to the expanded metal screen and to each other. The resultant current collector is provided with numerous small, interconnecting pores. Typically, the screen and sintered metal account for roughly equal parts by weight of the current collector, with the sintered metal occupying the larger proportion by volume. The expanded metal screen is preferably nickel plated steel while the sintered metal is preferably nickel.

The rechargeable active composition is formed of (in the discharged state) nickel hydroxide $Ni(OH)_2$. In the charged state of the material, the nickel is trivalent. In accordance with the invention the rechargeable active composition has disposed adjacent the surface thereof the hydroxide of at least one metal selected from the group consisting of zinc, mercury, and Group IIA metals.

The use of nickel hydroxide as a rechargeable active composition in rechargeable positive nickel electrodes is conventional, finding wide application in the manufacture of commercial nickel-cadmium cells and batteries. Conventional cells and batteries utilizing such conventional nickel electrodes have heretofore suffered the disadvantage of being able to accept reduced amounts of charge at temperatures above ambient temperature. That is, the amount of energy that can be delivered by discharging a nickel electorde-containing cell through a given load until a given terminal voltage level is reached is less for such a cell charged at a temperature above ambient temperature (77° F.) than for an otherwise identical cell charged at ambient temperature.

I have discovered quite unexpectedly that when small amounts of the hydroxide of at least one metal selected from the group consisting of zinc, mercury, and Group IIA metals are added to the nickel hydroxide so as to be disposed adjacent the surface thereof, the charge acceptance at elevated temperatures is dramatically enhanced. Typically, charge acceptance can be improved to levels of better than 90% of the ambient charge acceptance levels, even when the cells are charged and discharged at levels of 30 and 40 degrees above ambient.

It is believed that hydroxides of zinc, mercury and Group IIA metals function in some manner as a charge acceptance additive. By the addition of the charge acceptance additive to a rechargeable positive nickel electrode, significant improvement in charge acceptance can be obtained with amounts of charge acceptance additive as low as 0.1%, based on the total weight of the recharageable active composition in the positive electrode. It is preferred for most applications that the charge acceptance additive be present in the weight range of from 0.5 to 5.0%, based on the total weight of the rechargeable active composition. The maximum level of the charge acceptance additive is not considered to be critical, but concentrations above 15% may be undesirable for many applications, since electrode displacement volume is increased without further enhancement of charge acceptance. In other words, at levels above 15%, based on the weight of the rechargeable active composition, the excess charge acceptance additive merely acts as a diluent for the nickel hydroxide.

The Group IIA metals referred to herein are those metals commonly referred to as alkaline earths such as magnesium, calcium, strontium and barium. The Group IIA classification is taken from the periodic chart of the elements found in Lange's Handbook of Chemistry, McGraw-Hill Book Company, New York (1967) at pp. 60–61.

The addition of the hydroxide of at least one metal selected from the group consisting of zinc, mercury, and Group IIA metals is intended to include the use of a single metal hydroxide such as, for example, $CA(OH)_2$, as well as combinations of metal hydroxide such as, for example, the combination of $Zn(OH)_2$ and $Ca(OH)_2$. The term hydroxide is intended to embrace the combination of the metal ions associated with hydrogen and oxygen in proper proportions to be present as hydroxides. It is recognized, however, that in some instances, certain combinations, although referred to as hydroxides, will not be entirely present in hydroxide form. For example, when $Ca(OH)_2$ and $Zn(OH)_2$ are used together, they may exist in the electrode in associations which can be illustrated by the following chemical equations:

$$Ca(OH)_2 = Zn(OH)_2 \rightleftharpoons CaZnO_2 \cdot 2H_2O$$

Due to the possibility of formation of such complexes as illustrated above, the use of combinations of hydroxides of metals selected from the group consisting of zinc, mercury, Group IIA metals is preferred, although excellent results have been achieved using the hydroxide of only one of those metals.

The charge acceptance additive is incorporated in the rechargeable positive nickel electrode after the electrode has been fabricated by any conventional technique. According to a preferred technique, the zinc, mercury or Group IIA metals, or combinations thereof, are introduced in the desired amount in the form of soluble salts, such as chloride, nitrate, or carboxylate. By then impregnating the electrode with a base, such as potassium hydroxide, sodium hydroxide, etc., the metal or metals are precipitated within the electrode as hydroxides. If desired, the salt formed by the precipitation reaction—e.g. sodium carboxylate, potassium carboxylate, sodium chloride, etc.—may be washed from the electrode with water or a base.

Rechargeable positive nickel electrodes formed according to my invention may be utilized in conjunction with any conventional aqueous alkaline electrolyte to obtain enhanced charge acceptance at elevated temperatures. Nickel electrode-containing cells which are commercially sold typically, for example, usually incorporate potassium hydroxide as an electrolyte. I have discovered, quite unexpectedly, that sodium hydroxide when utilized as an electrolyte in conjunction with electrodes incorporating my novel charge acceptance additive imparts outstanding charge acceptance characteristics to cells charged at temperatures above 77° F. Accordingly, I prefer to use sodium hydroxide as an electrolyte in cells constructed according to my invention to obtain maximum charge acceptance. Conventional electrolyte concentrations can be used. Both sodium and potassium hydroxides are preferably utilized in concentrations ranging from 5 to 9 normal. Concentrations ranging from 1.0 to 20 N for sodium hydroxide and from 1.0 to 14 N for potassium hydroxide may be usefully employed.

Cells formed according to my invention may employ any conventional counter electrode. For example, rechargeable negative counter electrodes such as cadmium or zinc may be utilized. The counter electrode need not be rechargeable in all instances. For example, a cell constructed according to my invention may utilize a rechargeable positive nickel electrode and a standard hydrogen electrode as a counter electrode. My invention may be applied, therefore, to any conventional cell construction having a rechargeable nickel positive electrode and an aqueous alkaline electrolyte.

To illustrate the practice of my invention, a number of size c nickel-cadmium cells were constructed with spiral wound plates in a commercially marketed configuration illustrated by the drawing. As shown, the cell 1 is provided with a mandrel 3 formed of insulative material on which a negative plate 5 and a positive plate 7 are spirally wound in electronically insulated relation by interposed porous separators 9 and 11. Annular insulative washers 13 and 15 are located above and below the plates. A lead 17 extends from the lower edge of the negative plate to the cell casing 19, which forms the negative terminal of the cell. Electrolyte, indicated at 21, is held between the plates within the pores of the separators by capillary action with a small residual portion occupying the lower portion of cell casing 19. A positive terminal 23 for the cell is mounted on insulative disc 25. Casing 19 is sealingly crimped to the edge of disc 25. A lead 27 extends from an upper edge of positive plate 7 to a resilient strip 29 attached to positive terminal 23. A washer 31, cooperating with an outwardly toed portion 33 of positive terminal 23, holds terminal 23 locked to disc 25. V-grooves 35 in terminal 23 allow gas to escape from the interior of the cell. An O-ring 37 mounted beneath an annular shoulder on terminal 23 prevents gas from being vented from the cell until a predetermined pressure level develops therein.

The positive plate used in each cell was 15.8 cm. in length and 3.15 cm. in width for a geometrical surface area on one side of 0.5 square decimeter. The positive plate was 0.075 cm. in thickness and prior to introduction of the charge acceptance additive weighed 11.12 grams. The current collector for the positive plate was formed of nickel plated expanded steel screen having nickel powder sintered thereto. The current collector accounted for 46.8% by weight of the positive plate with the remainder of the plate weight being accounted for by active nickel in the form of nickel hydroxide, $Ni(OH)_2$. The sintered nickel constituted 53.3% by weight of the current collector while the expanded metal constituted the balance thereof.

The positive plates having the active nickel [$Ni(OH)_2$] therein were loaded respectively with $Ca(OH)_2$,

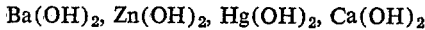

and $Zn(OH)_2$, $Ca(OH)_2$ and $Hg(OH)_2$, and $Ba(OH)_2$ and $Zn(OH)_2$ according to the following procedure. The plates were first dried 45 minutes at 85° C. in a forced air oven and then cooled to about 25° C. (77° F.). The plates were immersed in 2.0 liters of a charge acceptance additive solution containing 3.2 moles of the respective metal or combination of metals. The solutions were prepared by dissolving the acetate salt of the metal in acetic acid followed by addition of water. For example, a solution containing 1.6 moles of calcium and 1.6 moles of zinc was prepared by mixing together 297 grams of zinc acetate, 261 grams of calcium acetate, and 25 mls. of glacial acetic acid. Water was added to bring the volume to 2 liters. In each case a total of 3.2 moles of metal salt was used. Whenever combinations of two metal salts were used, 1.6 moles of each was used. The plates were removed from the charge acceptance additive solution and allowed to drain for 5 minutes. The plates were dried for 45 minutes at 85° C. in a forced air oven then cooled to 25° C. The plates were then introduced for 10 minutes into a precipitation solution at 25° C. consisting of potassium hydroxide having a specific gravity of 1.20 at room temperature. Thereafter the plates were washed with water having its pH adjusted to a level of 8–10 by the addition of ammonium hydroxide. Washing was conducted for 15 minutes at a temperature of 50° C. The washing step was thereafter repeated using a fresh washing solution. The loading procedure was then repeated. After drying the positive plate for 45 minutes at 85° C., it was cooled and weighed. The weight indicated that the charge acceptance additive constituted 0.8% by weight of the positive plate, or 1.3% by weight based on the weight of the rechargeable active composition of the plate.

For purposes of comparison, a first control electrode, hereinafter designated control A, was chosen which was identical to the treated plate prior to loading with charge acceptance additive. A second control electrode, hereafter designated control B, was chosen also initially identical to the treated plates prior to loading. Control B was subjected to the same washing and drying steps as the treated plates, but the steps of loading with charge acceptance additive and precipitating the charge acceptance additive were omitted. The purpose of preparing control B was to determine what, if any, effect the washing and drying of the plates might contribute to charge acceptance.

The treated plates and the controls were each incorporated in a separate cell of the construction of cell 1 in the drawing. The cells utilized 7.2 N potassium hydroxide as an electrolyte and identical cadmium electrodes as counter electrodes. Except for the differences in plate preparation procedure noted the cells were identical in construction.

Each of the cells was charged at 100 milliamperes for 20 hours at 77° F., allowed to rest for 2 hours, and then discharged at a constant current of 1 ampere to a cut-off voltage of 1 volt. This constituted the first charge-discharge cycle. The second charge-discharge cycle was similar, except that the cells were each charged at 125 ma. for 16 hours. The third charge-discharge cycle was identical to the second cycle, except the discharge rate was reduced to 200 ma. The fourth discharge cycle was identical to the second. The fifth discharge cycle was identical to the fourth, except that the temperature level throughout was raised from 77° F. to 110° F. By comparing the respective times to reach the cut-off voltage during cycles 5 and 4 for each cell, a comparison of charge acceptance of the cells at 110° F. as compared to 77° F. was obtained. The results are tabulated as follows:

TABLE I

KOH Electrolyte

| Charge acceptance additive: | Percentage of 77° F. charge acceptance at 110° F. |
|---|---|
| (1) None (control A) | 52.3 |
| (2) None (control B) | 52.3 |
| (3) Zinc hydroxide | 93.7 |
| (4) Mercury hydroxide | 77.7 |
| (5) Calcium hydroxide | 95.5 |
| (6) Barium hydroxide | 66.0 |
| (7) Zinc and calcium hydroxides | 98.8 |
| (8) Zinc and barium hydroxides | 78.0 |
| (9) Mercury and calcium hydroxides | 96.7 |

The results show that in marked contrast to the cells containing control plates A and B, the cells containing plates constructed in accordance with the invention exhibited a much higher percentage of cycle 4 charge capacity during cycle 5. This clearly illustrated the beneficial effects of the zinc, mercury, and Group IIA hydroxides as charge acceptance additives.

In further testing it was determined that cells constructed in accordance with the invention utilizing sodium hydroxide as an electrolyte retained capacity at elevated temperatures better than those cells utilizing potassium hydroxide. In a specific test a control cell was prepared identical to the cell above containing control A and a series of test cells was prepared identical to the cells tabulated in Table I above containing the treated plates.

Instead of using potassium hydroxide as the electrolyte 6.0 N sodium hydroxide was used.

The cells were put through 25 charge and discharge cycles. During each cycle the cells were charged at 100 ma. for 16 hours at 110° F. and discharged at 6 amperes at 110° F. to a cut-off voltage of 0.6 volts. The comparative performance is illustrated in Table II.

TABLE II

NaOH Electrolyte

| Charge acceptance additive: | Percentage of 77° F. charge acceptance at 110° F. |
|---|---|
| (1) None (control A') | 82.2 |
| (2) Zinc hydroxide | 92.9 |
| (3) Mercury hydroxide | 87.3 |
| (4) Calcium hydroxide | 96.2 |
| (5) Barium hydroxide | 89.6 |
| (6) Zinc and calcium hydroxides | 96.6 |
| (7) Zinc and barium hydroxides | 92.6 |
| (8) Mercury and calcium hydroxides | 91.4 |

The results indicate that cells constructed in accordance with the invention utilizing sodium hydroxide as an electrolyte exhibit superior charge acceptance at elevated temperatures as compared to like cells utilizing potassium hydroxide as an electrolyte.

While I have disclosed my invention by reference to certain preferred embodiments, it is appreciated that numerous variations will readily occur to those skilled in the art. It is accordingly intended that the scope of my invention be interpreted by reference to the following claims.

What is claimed is:

1. A method of making a rechargeable positive nickel electrode having superior high temperature charge acceptance comprising the steps of:
   (a) loading a current collector with a rechargeable active material which includes a porous layer of nickel hydroxide, and (b) subsequently treating said positive nickel electrode with a charge acceptance additive containing the hydroxide of at least one metal selected from the group consisting of zinc, mercury and Group IIA metals until the charge acceptance additive amounts to 0.5 to 5.0% by weight of the total of said active material plus additive to disposed said charge acceptance additive adjacent the surface of said nickel hydroxide thereby resulting in an electrode having said additive dispersed in said active material.

2. A rechargeable positive nickel electrode having superior high temperature charge acceptance comprising a current collector having a porous layer of active nickel electrode material thereon characterized in the discharged state of such electrode as $Ni(OH)_2$ having dispersed therein a high temperature charge acceptance additive after fabrication of the electrode to dispose said additive adjacent the internal surfaces of said active material, said charge acceptance additive consisting essentially of the hydroxide of at least one metal selected from the group consisting of zinc, mercury, and Group IIA metals in an amount of from about 0.5 to 5.0% by weight of the total weight of said active material.

References Cited

UNITED STATES PATENTS

| | | | |
|---|---|---|---|
| 3,211,587 | 10/1965 | Shair et al. | 136—28 |
| 3,342,640 | 9/1967 | Herold et al. | 136—28 |
| 3,353,998 | 11/1967 | Langguth et al. | 136—6 |
| 3,615,830 | 10/1971 | Johnson | 136—28 |

ALLEN B. CURTIS, Primary Examiner

C. F. LE FEVOUR, Assistant Examiner

U.S. Cl. X.R.

136—29